United States Patent
Faragher et al.

(10) Patent No.: US 12,388,497 B2
(45) Date of Patent: Aug. 12, 2025

(54) METHOD AND APPARATUS FOR PERFORMING DIRECTION DIVISION MULTIPLE ACCESS

(71) Applicant: Focal Point Positioning Limited, Cambridge (GB)

(72) Inventors: Ramsey Michael Faragher, Cambridge (GB); Robert Mark Crockett, Cambridge (GB); Peter James Duffett-Smith, Cambridge (GB)

(73) Assignee: FOCAL POINT POSITIONING LIMITED, Cambridge (GB)

( * ) Notice: Subject to any disclaimer, the term of this patent is extended or adjusted under 35 U.S.C. 154(b) by 56 days.

(21) Appl. No.: 18/524,022

(22) Filed: Nov. 30, 2023

(65) Prior Publication Data

US 2024/0195460 A1  Jun. 13, 2024

Related U.S. Application Data

(60) Provisional application No. 63/431,424, filed on Dec. 9, 2022.

(51) Int. Cl.
*H04B 7/0426* (2017.01)
*H04B 7/06* (2006.01)
*H04L 5/00* (2006.01)

(52) U.S. Cl.
CPC .......... *H04B 7/043* (2013.01); *H04B 7/0617* (2013.01); *H04L 5/0048* (2013.01)

(58) Field of Classification Search
CPC .... H04B 7/043; H04B 7/0617; H04B 7/0697; H04L 5/0048; G01S 3/043
See application file for complete search history.

(56) References Cited

U.S. PATENT DOCUMENTS

| | | | |
|---|---|---|---|
| 9,780,829 B1 | 10/2017 | Faragher et al. | |
| 10,321,430 B2 | 6/2019 | Faragher et al. | |
| 10,816,672 B2 | 10/2020 | Faragher et al. | |
| 11,474,258 B2 | 10/2022 | Faragher et al. | |
| 2020/0264317 A1 | 8/2020 | Faragher et al. | |
| 2020/0319347 A1* | 10/2020 | Faragher | G01S 19/428 |

FOREIGN PATENT DOCUMENTS

EP  1 062 746 B1  3/2004

OTHER PUBLICATIONS

PCT International Search Report and Written Opinion for PCT/GB2023/053165 dated Feb. 26, 2024.

* cited by examiner

*Primary Examiner* — David S Huang
(74) *Attorney, Agent, or Firm* — MOSER TABOA

(57) ABSTRACT

A method and apparatus for performing direction division multiple access. In some embodiments, the method includes: performing motion compensated correlation upon a received signal transmitted from a transceiver to generate at least one motion compensated correlation result; identifying a direction of arrival for the received signal using the at least one motion compensated correlation result; and selecting, using the direction of arrival of the received signal, to communicate with the transceiver.

14 Claims, 3 Drawing Sheets

METHOD AND APPARATUS FOR PERFORMING DIRECTION DIVISION MULTIPLE ACCESS

CROSS-REFERENCE TO RELATED APPLICATIONS

This application claims priority to U.S. Provisional Patent Application 63/431,424, filed Dec. 9, 2022, the entire contents of which are incorporated by reference herein.

BACKGROUND

Field

Embodiments of the present invention generally relate to radio communications and, in particular, to a method and apparatus for performing direction division multiple access (DDMA).

Description of the Related Art

Various forms of multiplexing are used in radio frequency (RF) communications such as CDMA (code division multiple access), TDMA (time division multiple access), FDMA (frequency division multiple access), SDMA (space division multiple access), etc. In each of these multiplexing techniques, the signals are manipulated (applying various codes, timeslots and frequencies to the signals) such that additional communications channels can be formed within given bandwidth.

Space division multiple access (SDMA) relies on directional antenna beam forming to limit interference amongst transceivers. Each transceiver comprises a multi-element antenna. The transceiver applies phase shifts to signals transmitted and received by the antenna elements such that the antenna's pattern is focused in a particular direction. Because the pattern is directional and can be "pointed" at another transceiver, the transceiver can maximize signal strength of signals transmitted by desired transceivers and suppress signal strength of signals transmitted by undesired transceivers. The beam steering process is complex, expensive and fraught with errors.

Because of this complexity, SDMA systems generally are used in point-to-point communications where the transceivers are static and in known locations. When the transceivers are moving, the SDMA system requires further complexity to know the location of transceiver such that the beams can be steered and tracked in the correct direction.

Therefore, there is a need for a method and apparatus for performing a new process called DDMA (direction division multiple access) and, in particular, the benefits of DDMA amongst moving transceivers without the use of physically large beam steering antennas.

SUMMARY

Embodiments of the present invention generally relate to a method and apparatus for performing directional division multiple access as shown in and/or described in connection with at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a particular description of the invention, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
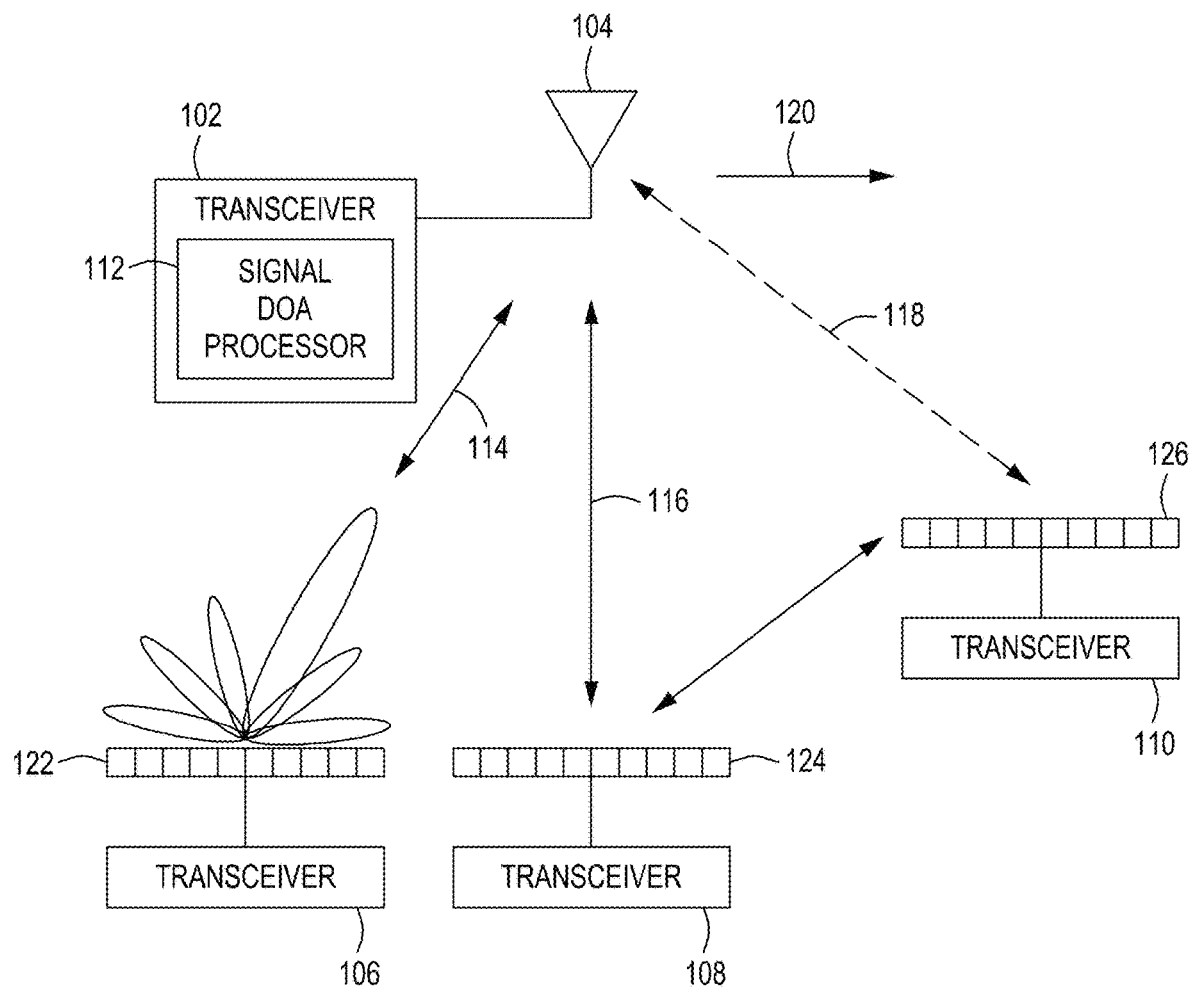
FIG. 1 depicts a block diagram of a scenario having a plurality of transceivers that communicate amongst each other using directional division multiple access in accordance with at least one embodiment of the invention.

Embodiments of the present invention comprise apparatus and methods for performing directional division multiple access (DDMA) without the need for beam steering antennas. Modern communication systems utilize digital signals to improve communication throughput and security. Most of these systems utilize some form of deterministic digital code to facilitate signal acquisition, e.g., Gold codes, training sequences, synchronization words, or channel characterization sequences. Such a digital code is deterministic by the receiver and repeatedly broadcast by the transmitter to enable communications receivers to acquire and receive the transmitted signals. Using such deterministic codes combined with an accurate motion model of the receiver, embodiments of the invention are useful for identifying a direction of arrival (DoA) for a propagation path between the receiver and transmitter. The technique for performing this DoA determination using receiver motion information is known as SUPERCORRELATION™ and is described in commonly assigned U.S. Pat. No. 9,780,829, issued 3 Oct. 2017; U.S. Pat. No. 10,321,430, issued 11 Jun. 2019; U.S. Pat. No. 10,816,672, issued 27 Oct. 2020; US patent publication 2020/0264317, published 20 Aug. 2020; and US patent publication 2020/0319347, published 8 Oct. 2020, which are hereby incorporated herein by reference in their entireties. The receiver may use this DoA data to discriminate between signals propagating from various transmitters.

For example, a transceiver (operating in receive mode) may be transported through an area containing a number of other transceivers (operating in transmit mode) and be able to select to receive signals from some directions and reject signals from other directions even when the transceiver has a single omnidirectional antenna. Such a system of transceivers performs DDMA to selectively communicate with neighboring transceivers. Once a direction of arrival for a received signal is known, the transceiver may utilize a directional antenna array to steer a beam in the direction of the transceiver that sent the received signal. Additionally, or alternatively, the transceiver that received the signal may inform the transmitting transceiver of the direction to transmit for future communications and the transmitting transceiver may utilize a beam forming antenna to direct a beam toward the receiving transceiver. Consequently, complex and computationally heavy beam steering techniques are not used until the transceivers know the direction estimates for transceivers with which they will communicate.

FIG. 1 depicts a block diagram of a scenario 100 having a transceiver 102 for performing DDMA based selective signal reception of signals transmitted from transceivers 106, 108 and 110 in accordance with at least one embodiment of the invention. In one embodiment, the transceivers 102, 106, 108, 110 each may utilize a single omnidirectional antenna 104 to transmit and receive signals. The use of the omnidirectional antenna may be transitory such that it is used to acquire the direction of a stationary base station 106 relative to the mobile transceiver 102 and then use an antenna array to beam steer an antenna pattern in the direction of the base station. In addition, or alternatively, the mobile transceiver 102, may inform the base station 106 of the direction the base station should steer a beam to communicate with the mobile transceiver.

The mobile transceiver 102 comprises a signal DoA processor configured to receive and process signals transmitted by other transceivers 106, 108, 110 (three transceivers are depicted, but the receiver 102 may process the signals from any number of transceivers). The signals from the transceivers 106, 108 and 110 (e.g., stationary base stations) are intended to communicate with a mobile device, e.g., cellular telephone, laptop computer, tablets, Internet of Things (IOT) devices, etc. that communicate, for example, using cellular signals, e.g., CDMA, GSM and the like that support cellular standards such as, but not limited to, 3G, 4G, LTE, and/or 5G standards. The transceiver 102 may be a portion of a cellular mobile device. In other embodiments, the transceivers are any form of radio that uses signals containing a deterministic digital code to facilitate signal acquisition. Any such transceiver may find technical benefits from using DDMA to improve signal throughput and security.

The mobile transceiver 102 comprises the signal DoA processor 112 to determine the DoA of signals transmitted from transceivers 106, 108, 110 in accordance with at least one embodiment of the invention. The signal DoA processor 112 determines the DoA of each received signal and then can proceed to process some signals 114 and 116 to receive data from transceivers 106 and 108, or ignore other signals 118. As described in detail below, the signal DoA processor 112 uses a SUPERCORRELATION™ technique as described in commonly assigned U.S. Pat. No. 9,780,829, issued 3 Oct. 2017; U.S. Pat. No. 10,321,430, issued 11 Jun. 2019; U.S. Pat. No. 10,816,672, issued 27 Oct. 2020; US patent publication 2020/0264317, published 20 Aug. 2020; and US patent publication 2020/0319347, published 8 Oct. 2020, which are hereby incorporated herein by reference in their entireties. The technique determines a direction of arrival (DoA) of received signals 114, 116, 118. As the receiver 102 moves (represented by arrow 120), the signal DoA processor 112 computes motion information representing motion of the transceiver 102. The motion information is used to perform motion compensated correlation of the received signals 114, 116, 118. From the motion compensated correlation process, the signal DoA processor 112 estimates the DoA of the signals 114, 116, 118. The transceiver 102 then decides which signals to process and which signals to reject.

In one embodiment, all the mobile transceiver 102 comprises a signal DoA processor 112 such that the transceivers communicate with one another using DDMA. As such, for example, transceiver 106 may communicate with transceiver 102, but chose not to communicate with transceivers 108 and 110. Similarly, transceiver 108 may communicate with transceivers 102 and 110, but not communicate with transceiver 106. The mobile transceiver 102 may use a single inexpensive omnidirectional antenna 104 to receive and transmit signals. Although the omnidirectional antenna 104 sends and receives signals to/from all directions, the signal DoA processor 112 selects the DoA from which it desires to receive a signal; thus, only receiving signals from specific transceivers. Once the DoA of signals from the desired transceivers 106 and 108 are known, the mobile transceiver 102 may inform transceiver 106 and 108 of the DoA such that the transceivers may control directional antennas 122 and 124 to steer antenna beams in the direction of the transceiver 102. In some embodiments, the mobile transceiver may comprise a beam steering antenna such that, once the desired signal DoA is known, the transceiver 102 uses the steerable antenna to communicate with the transceivers 106 and 108. Consequently, the transceiver 102 may use an omnidirectional antenna for signal acquisition and switch to a directional antenna when communicating data. An antenna pattern null may be positioned to suppress signals 118 from transceiver 110. In this manner, the transceivers implement a DDMA system to improve communication robustness, data throughput, and security.

Figure 2:
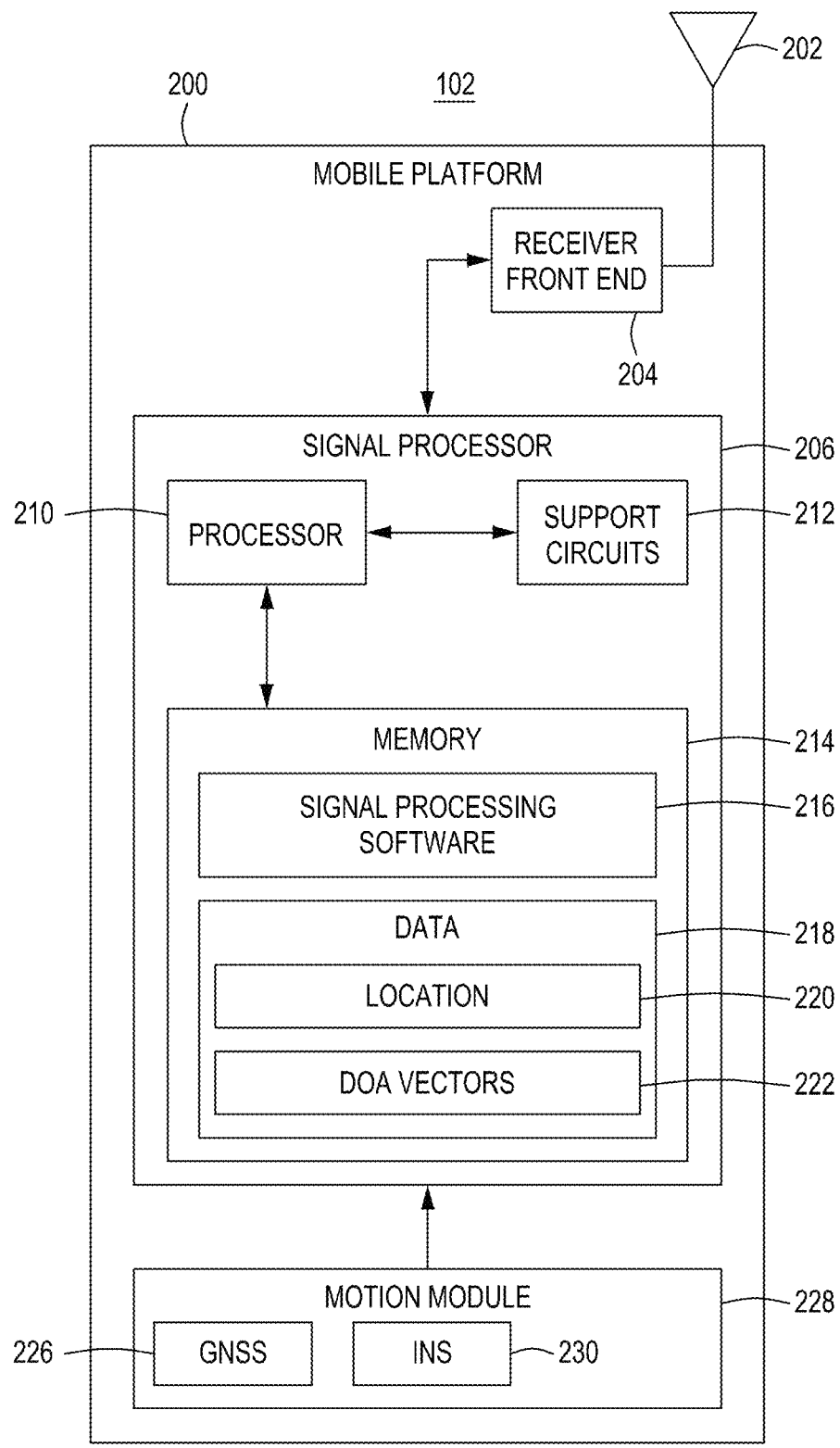
FIG. 2 is a block diagram of a transceiver of FIG. 1 in accordance with at least one embodiment of the invention.

FIG. 2 is a block diagram of the transceiver 102 in accordance with at least one embodiment of the invention. The transceiver 102 comprises a mobile platform 200, an antenna 202, receiver front end 204, signal processor 206, and motion module 228. The transceiver 102 may form a portion of a laptop computer, mobile phone, tablet computer, Internet of Things (IOT) device, unmanned aerial vehicle, mobile computing system in an autonomous vehicle, human operated vehicle, etc.

In the transceiver 102, the mobile platform 200 and the antenna 202 are an indivisible unit where the antenna 202 moves with the mobile platform 200. The operation of the SUPERCORRELATION™ technique operates based upon determining the motion of the signal receiving antenna. Any mention of motion herein refers to the motion of the antenna 202. In some embodiments, the antenna 202 may be separate from the mobile platform 200. In such a situation, the motion estimate used in the motion compensated correlation process is the motion of the antenna 202. In most scenarios, the motion of the mobile platform 200 is the same as the motion of the antenna 202 and, as such, the following description will assume that the motion of the platform 200 and antenna 202 are the same.

The mobile platform 200 comprises a receiver front end 204, a signal processor 206 and a motion module 228. The receiver front end 204 downconverts, filters, and samples (digitizes) the received signals in a manner that is well-known to those skilled in the art. The output of the receiver front end 204 is a digital signal containing data. The data of interest is a deterministic training or acquisition code, e.g., Gold code, used by the transceiver 102 to synchronize the transmission to other transceivers.

The signal processor 206 comprises at least one processor 210, support circuits 212 and memory 214. The at least one processor 210 may be any form of processor or combination of processors including, but not limited to, central processing units, microprocessors, microcontrollers, field programmable gate arrays, graphics processing units, digital signal processors, and the like. The support circuits 212 may comprise well-known circuits and devices facilitating functionality of the processor(s). The support circuits 212 may comprise one or more of, or a combination of, power supplies, clock circuits, analog-to-digital converters, communications circuits, cache, displays, and/or the like.

The memory 214 comprises one or more forms of non-transitory computer readable media including one or more of, or any combination of, read-only memory or random-access memory. The memory 214 stores software and data including, for example, signal processing software 216 and data 218. The data 218 comprises the receiver motion 220, direction of arrival (DOA) vectors 222 (collectively, DoA data), and various data used to perform the SUPERCORRELATION™ processing. The signal processing software 216, when executed by the one or more processors 210, performs motion compensated correlation upon the received signals to estimate the DoA vectors for the received signals. The motion compensated correlation process is described in detail below. The operation of the signal processing software 216 functions as the signal DoA processor 104 of FIG. 1.

As described below in detail, the DoA vectors 222 are used by the signal processing software 216 to select the signals to be received and processed. The data 218 stored in memory 214 may also include signal estimates, correlation results, motion compensation information, and other parameter hypotheses, position information and the like.

The motion module 228 generates a motion estimate for the receiver 102. The motion module 228 may comprise an inertial navigation system (INS) 230 as well as a global navigation satellite system (GNSS) receiver 226 such as GPS, GLONASS, GALILEO, BEIDOU, etc. The INS 230 may comprise one or more of, but not limited to, a gyroscope, a magnetometer, an accelerometer, and the like. To facilitate motion compensated correlation, the motion module 228 produces motion information (sometimes referred to as a motion model) comprising at least a velocity of the antenna 202 in the direction of an emitter of interest, i.e., an estimated direction of a source of a received signal. In some embodiments, the motion information may also comprise estimates of platform orientation or heading including, but not limited to, pitch, roll and yaw of the platform 200/antenna 202. Generally, the receiver 102 may test every direction and iteratively narrow the search to one or more directions of interest.

Figure 3:
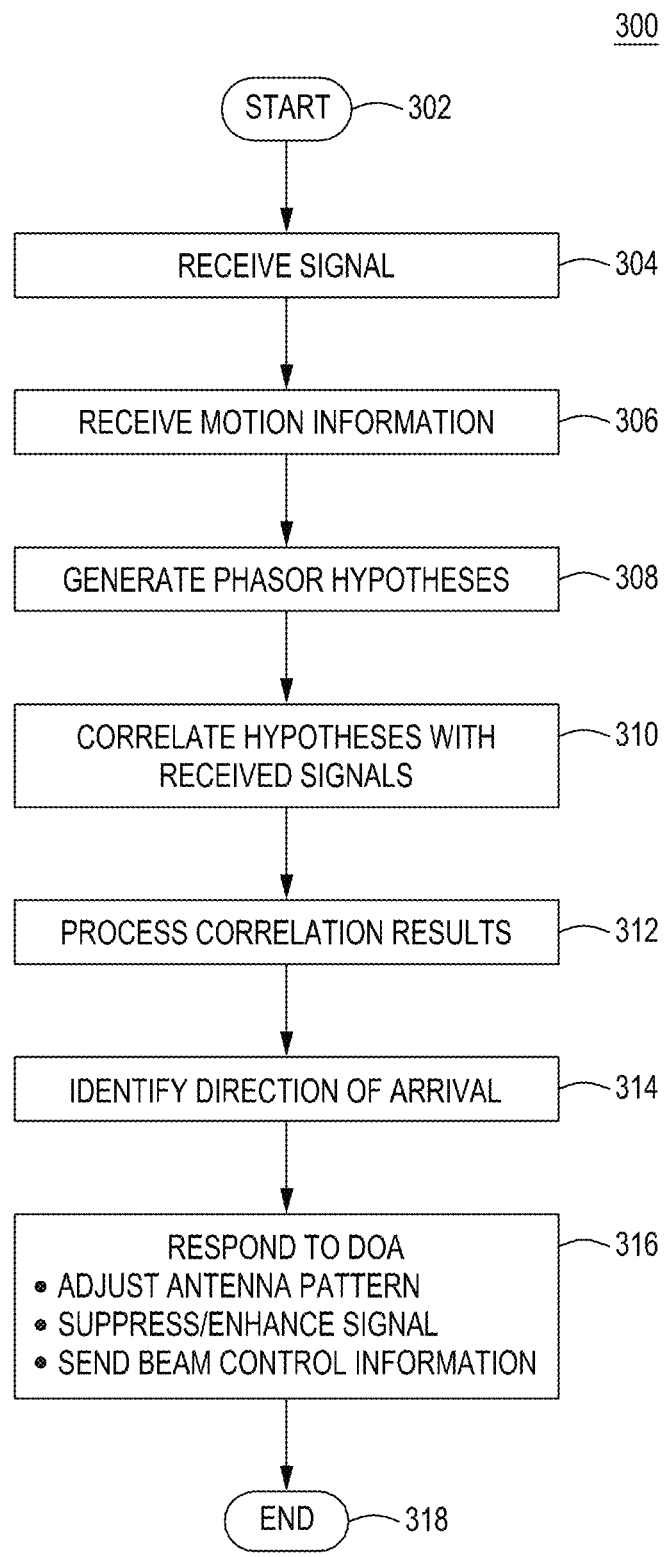
FIG. 3 is a flow diagram of a method of operation for the signal processing software in accordance with at least one embodiment of the invention.

FIG. 3 is a flow diagram of a method 300 of operation for the signal processing software 216 in accordance with at least one embodiment of the invention. The method 300 may be implemented in software, hardware or a combination of both (e.g., using the signal processor 206 of FIG. 2).

The method 300 begins at 302 and proceeds to 304 where signals are received at a transceiver from at least one remote source (e.g., transmitters such as the transceiver 106, 108, 110 of FIG. 1) in a manner as described with respect to FIG. 1. Each received signal comprises a synchronization or acquisition code, e.g., a Gold code, extracted from the radio frequency (RF) signal received at the antenna. The process of downconverting the RF signal and extracting the digital code is well known in the art. At 306, the method 300 receives motion information from the motion module 228 of FIG. 2. The motion information comprises an estimate of the motion of the receiver 102 of FIG. 1, e.g., one or more of velocity, heading, orientation, etc.

At 308, the method 300 generates a plurality of phasor sequence hypotheses related to a direction of interest of the received signal (i.e., direction toward a transceiver). Each phasor sequence hypothesis comprises a time series of phase offset estimates that vary with parameters such as receiver motion, frequency, DoA of the received signals, and the like. The signal processing correlates a local code encoded in a local signal with the same code encoded within the received RF signal. In one embodiment, the phasor sequence hypotheses are used to adjust, at a sub-wavelength accuracy, the carrier phase of the local signal. In some embodiments, such adjustment or compensation may be performed by adjusting a local oscillator signal, the received signal(s), or the correlation result to produce a phase compensated correlation result. The signals and/or correlation results are complex signals comprising in-phase (I) and quadrature phase (Q) components. The method applies each phase offset in the phasor sequence to a corresponding complex sample in the signals or correlation results. If the phase adjustment includes an adjustment for a component of receiver motion in an estimated direction of the emitter, then the result is a motion compensated correlation result. For each received signal, at 310, the method 300 correlates the received signals with a set (plurality) of direction hypotheses containing estimates of the phase offset sequences necessary to accurately correlate the received signals over a long coherent integration period (e.g., 1 second). There is a set of hypotheses representing a search space for each received signal.

The motion estimates are typically hypotheses of the receiver motion in a direction of interest such as in the direction of the transceiver that transmitted the received signal. At initialization, the direction of interest may be unknown or inaccurately estimated. Consequently, a brute force search technique may be used to identify one or more directions of interest by searching over all directions and correlating signals received in all directions. A comparison of correlation results over all the directions enables the method 400 to narrow the search space. There is very strong correlation between the true values of these hypotheses between code repetition, such that the initial search might be intensive, but subsequent processing only requires tracking of the parameters in the receiver as they evolve. Consequently, subsequent compensation is performed over a narrow search space.

In one embodiment, if a signal from a given transceiver was received previously, the set of hypotheses for the newly received signal include a group of phasor sequence hypotheses using the expected Doppler and Doppler rate and/or last Doppler and last Doppler rate used in receiving the prior signal from that particular emitter. The values may be centered around the last values used or the last values used additionally offset by a prediction of further offset based on the expected receiver motion. At 310, the method 300 correlates each received signal with that signal's set of hypotheses. The hypotheses are used as parameters to form the phase-compensated phasors to phase compensate the signal correlation process. As such, the phase compensation may be applied to the received signals, the local frequency source (e.g., an oscillator), or the correlation result values. In addition to searching over the DoA, the method 300 may also apply hypotheses related to other variables (parameters) such as oscillator frequency to correct frequency and/or phase drift (if not previously corrected), or heading to ensure the correct motion compensation is being applied. The number of hypotheses may not be the same for each variable. For example, the search space may contain ten hypotheses for searching DoA and have two hypotheses for searching a receiver motion parameter such as velocity—i.e., a total of twenty hypotheses (ten multiplied by two). The result of the correlation process is a plurality of phase-compensated correlation results—one phase-compensated correlation result value for each hypothesis for each received signal.

At 312, the method 300 processes the correlation results to find the "best" or optimal result for each received signal. The correlation output may be a single value that represents the parameter hypotheses (preferred hypotheses) that provide an optimal or best correlation output. In general, a cost function is applied to the correlation values for each received signal to find the optimal correlation output corresponding to a preferred hypothesis or hypotheses, e.g., a maximum correlation value is associated with the preferred hypothesis for the correct signal DoA.

At 314, the method 300 identifies the DoA vector of each received signal from the optimal correlation result for the signal. The received signals along the DoA vector typically have the strongest signal to noise ratio and represent line of sight (LOS) reception between the emitter and receiver. As such, using motion compensated correlation enables the transceiver 102 to identify the DoA vector of the received signal(s). In other embodiments, rather than using the largest magnitude correlation value, other test criteria may be used. For example, the method 300 may monitor the progression of correlations as hypotheses are tested and apply a cost function that indicates the best hypotheses when the cost function reaches a minimum (e.g., a small hamming distance amongst peaks in the correlation plots). In other embodiments, additional hypotheses may be tested in addition to the DoA hypotheses to, for example, ensure the motion compensation (i.e., speed and heading) is correct.

At 316, the method 300 generates a response to the determined DoA. For example, a response may be to adjust the antenna pattern of the transceiver to establish a beam in the direction of the DoA. In addition, or alternatively, the method 300 may adjust the antenna pattern of the transceiver to establish an antenna pattern null in the direction of the DoA to suppress the signal in that direction. In another embodiment, rather than adjust the antenna, the received signals may be processed to either enhance or decrease the signal to noise ratio for signals received along a particular DoA. In yet another embodiment, the method 300 may send beam control information to the transceiver that transmitted the received signal. The beam control information may comprise one or more of the DoA, the receiving transceiver location, direction of travel, other heading information, and any other information that the transmitting transceiver may use to point an antenna beam and track the receiving transceiver.

Broadly speaking, once the DoA is known, the method 300 responds using one or more of the foregoing techniques to facilitate creation of a DDMA system. The DDMA system uses narrow beam transmissions between transceivers to improve data throughput, create a robust communication system, improve computational efficiency, improve noise immunity, and improve transmission security.

The method 300 ends at 318.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g. A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. A method for performing directional division multiple access, comprising:
   performing motion compensated correlation upon a received signal transmitted from a transceiver to generate at least one motion compensated correlation result;
   identifying a direction of arrival for the received signal using the at least one motion compensated correlation result; and
   selecting, using the direction of arrival of the received signal, to communicate with the transceiver,
   wherein selecting to communicate with the transceiver includes sending a response to the identified direction of arrival, and wherein the response includes at least one of:
      adjusting an antenna pattern of the transceiver to establish a beam in the direction of the direction of arrival;
      adjusting an antenna pattern of the transceiver to establish an antenna pattern null in the direction of the direction of arrival to suppress the signal in that direction; or
      sending beam control information to the transceiver that transmitted the received signal.

2. The method of claim 1, further comprising receiving motion information comprising an estimate of motion of an antenna of a receiver that received the signal.

3. The method of claim 1, further comprising generating a plurality of phasor sequence hypotheses related to a direction of interest of the received signal, wherein each phasor sequence hypothesis comprises a time series of phase offset estimates that vary with at least one of receiver motion, frequency, or direction of arrival of the received signals.

4. The method of claim 1, wherein performing motion compensated correlation includes correlating the received signal with a plurality of direction hypotheses containing estimates of phase offset sequences to accurately correlate the received signals over a long coherent integration period.

5. The method of claim 1, further comprising determining an optimal correlation result for each received signal by processing the at least one motion compensated correlation result, wherein identifying a direction of arrival includes identifying a direction of arrival vector of each received signal from the optimal correlation result for the signal.

6. The method of claim 1, wherein the response includes processing the received signal to either increase or decrease the signal to noise ratio for signals received along a certain direction of arrival.

7. An apparatus for performing directional division multiple access, comprising at least one processor and at least one non-transient computer readable medium for storing instructions that, when executed by the at least one processor, causes the apparatus to perform operations comprising:
performing motion compensated correlation upon a received signal transmitted from a transceiver to generate at least one motion compensated correlation result;
identifying a direction of arrival for the received signal using the at least one motion compensated correlation result; and
selecting, using the direction of arrival of the received signal, to communicate with the transceiver,
wherein selecting to communicate with the transceiver includes sending a response to the identified direction of arrival, and wherein the response includes at least one of:
adjusting an antenna pattern of the transceiver to establish a beam in the direction of the direction of arrival;
adjusting an antenna pattern of the transceiver to establish an antenna pattern null in the direction of the direction of arrival to suppress the signal in that direction; or
sending beam control information to the transceiver that transmitted the received signal.

8. The apparatus of claim 7, the operations further comprising receiving motion information comprising an estimate of motion of an antenna of a receiver that received the signal.

9. The apparatus of claim 7, the operations further comprising generating a plurality of phasor sequence hypotheses related to a direction of interest of the received signal, wherein each phasor sequence hypothesis comprises a time series of phase offset estimates that vary with at least one of receiver motion, frequency, or direction of arrival of the received signals.

10. The apparatus of claim 7, the operations performing motion compensated correlation includes correlating the received signal with a plurality of direction hypotheses containing estimates of phase offset sequences to accurately correlate the received signals over a long coherent integration period.

11. The apparatus of claim 7, the operations further comprising determining an optimal correlation result for each received signal by processing the at least one motion compensated correlation result, wherein identifying a direction of arrival includes identifying a direction of arrival vector of each received signal from the optimal correlation result for the signal.

12. The apparatus of claim 7, wherein the response includes processing the received signal to either increase or decrease the signal to noise ratio for signals received along a certain direction of arrival.

13. At least one non-transient computer readable medium storing instructions that, when executed by at least one processor, causes the processor to perform operations comprising:
performing motion compensated correlation upon a received signal transmitted from a transceiver to generate at least one motion compensated correlation result;
identifying a direction of arrival for the received signal using the at least one motion compensated correlation result; and
selecting, using the direction of arrival of the received signal, to communicate with the transceiver,
wherein selecting to communicate with the transceiver includes sending a response to the identified direction of arrival, and wherein the response includes at least one of:
adjusting an antenna pattern of the transceiver to establish a beam in the direction of the direction of arrival;
adjusting an antenna pattern of the transceiver to establish an antenna pattern null in the direction of the direction of arrival to suppress the signal in that direction;
processing the received signal to either increase or decrease the signal to noise ratio for signals received along a certain direction of arrival; or
sending beam control information to the transceiver that transmitted the received signal.

14. The medium of claim 13,
processing the received signal to either increase or decrease the signal to noise ratio for signals received along a certain direction of arrival.

* * * * *